US008141842B2

(12) United States Patent
Imamura et al.

(10) Patent No.: US 8,141,842 B2
(45) Date of Patent: Mar. 27, 2012

(54) SOLENOID VALVE

(75) Inventors: Ken Imamura, Okazaki (JP); Atsushi Honda, Seto (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 535 days.

(21) Appl. No.: 12/417,292

(22) Filed: Apr. 2, 2009

(65) Prior Publication Data

US 2009/0250645 A1 Oct. 8, 2009

(30) Foreign Application Priority Data

Apr. 3, 2008 (JP) ................... 2008-097533

(51) Int. Cl.
*F16K 31/08* (2006.01)
(52) U.S. Cl. .................... 251/65; 137/625.69
(58) Field of Classification Search .......... 251/65, 251/129.15; 137/625.25, 625.65, 625.67, 137/625.69
See application file for complete search history.

(56) References Cited

U.S. PATENT DOCUMENTS

| 4,403,765 | A | * | 9/1983 | Fisher ............................ 251/65 |
| 4,807,846 | A | * | 2/1989 | Greiner et al. ........... 251/129.15 |
| 5,915,665 | A | * | 6/1999 | Paese et al. ................ 251/30.04 |
| 6,199,587 | B1 | * | 3/2001 | Shlomi et al. .............. 137/625.5 |

FOREIGN PATENT DOCUMENTS

JP 2138583 5/1990
JP 8135839 5/1996

* cited by examiner

*Primary Examiner* — John Fristoe, Jr.
(74) *Attorney, Agent, or Firm* — Gifford, Krass, Sprinkle, Anderson & Citkowski, P.C.

(57) ABSTRACT

A solenoid valve includes a valve housing in which a spool valve element is fitted to be reciprocably slidable along an axis; a magnet coil that moves the spool valve element in a first direction along the axis by an action of an electromagnetic force; a return spring that biases the spool valve element in a second direction, opposite to the first direction, and moves the spool valve element in the second direction when the magnet coil is not excited; and first and second attraction members that are respectively fixed to the spool valve element and the valve housing such that they are spaced from each other along the axis by a distance no less than a maximum moving amount of the spool valve element and attract each other by an attraction force smaller than a bias force of the return spring when the magnet coil is not excited.

7 Claims, 4 Drawing Sheets

SOLENOID VALVE

CROSS REFERENCE TO RELATED APPLICATIONS

This application claims priority to Japanese Patent Application No. 2008-97533 filed on Apr. 3, 2008, which is incorporated herein by reference in its entirety including the specification, drawings and abstract.

BACKGROUND OF THE INVENTION

1. Field of the Invention

The present invention relates to a solenoid valve used for controlling a fluid, more specifically, to a power saving technology of the solenoid valve.

2. Description of the Related Art

Japanese Patent Application Publication No. 02-138583 (JP-A-02-138583) describes a solenoid valve that varies a pressure, a flow volume, a flow path, etc. of a fluid by exciting a magnet coil. The solenoid valve includes a magnet coil, a mover that is moved in one direction by an action of electromagnetic force generated by exciting the magnet coil, a spool valve element that is disposed on the side in the one direction of the mover, and is pressed by the mover to move in the one direction, a valve housing in which the spool valve element is fitted so as to be reciprocably slidable along an axis, a return spring that biases the spool valve element in a return direction, which is opposite to the one direction, and moves both the mover and the spool valve element in the return direction when the magnet coil is not excited.

SUMMARY OF THE INVENTION

In the above-described solenoid valve, as the spool valve element is moved further in the one direction when the magnet coil is excited, the bias force of the return spring acting on the spool valve element increases, and thus the electric power necessary for the solenoid valve to maintain the current position of the spool valve element increases. In other words, when the spool valve element is moved the maximum moving amount (maximum stroke), power consumption of the solenoid valve is maximized to maintain the current position of the spool valve element. This mechanism of power consumption is not publicly known. Therefore, in view of the movement of the spool valve element with the maximum moving amount, there is room for improvement to reduce the power consumption of the solenoid valve.

The present invention provides a solenoid valve that reduces power consumption by reducing electromagnetic power generated by a magnet coil.

A first aspect of the present invention provides a solenoid valve that includes a valve housing in which a spool valve element is fitted so as to be reciprocably slidable along an axis; a magnet coil that moves the spool valve element in a first direction along the axis by an action of an electromagnetic force; a return spring that biases the spool valve element in a second direction, which is opposite to the first direction, and moves the spool valve element in the second direction when the magnet coil is not excited; and first and second attraction members that are respectively fixed to an end portion on the first direction side of the spool valve element and the valve housing such that the first and the second attraction members are spaced from each other along the axis by a distance equal to or greater than a maximum moving amount of the spool valve element and magnetically attract each other by a magnetic attraction force smaller than a bias force of the return spring when the magnet coil is not excited.

According to the first aspect of the present invention, as the spool valve element is moved further in the first direction, the first and second magnetic attraction members are moved closer to each other. As a result, the attraction force between the first and second magnetic attraction members cancels the bias force of the return spring to a certain extent. This enables reduction in the power consumption of the solenoid valve and reduction in the heat generation from the magnet coil.

The second magnetic attraction member fixed to the valve housing may be a permanent magnet, and may be provided on the second direction side of a ferromagnetic lid member that is attached to the valve housing.

According to this construction, because the lid member on which the permanent magnet is provided is a ferromagnetic material, the attraction force between the first and second magnetic attraction members is increased. Therefore, even if an inexpensive small permanent magnet is used as the magnetic attraction members, sufficient attraction force can be obtained.

The end portion on the first direction side of the spool valve element on which the first magnetic attraction member is fixed may be a ferromagnetic material.

According to this construction, the magnetic attraction force between the first and second magnetic attraction members is increased, and the magnetic attraction members can be downsized.

A gap may be formed between the first magnetic attraction member and second magnetic attraction member when the spool valve element is moved the maximum moving amount in the first direction.

According to this construction, the magnetic attraction members are prevented from being damaged by contacting each other.

An output pressure of the solenoid valve may act on the spool valve element as a feedback thrust in the second direction due to the difference in pressure receiving area of the spool valve element, and the sum total of the feedback thrust and the bias force of the return spring acting on the spool valve element may be greater than the magnetic attraction force between the first magnetic attraction member and the second magnetic attraction member.

According to this, when the magnet coil is switched to an unexcited state, the spool valve element is moved in the second direction.

The solenoid valve may be a linear solenoid valve used for hydraulic pressure control of a vehicle.

Moreover, at least a portion of end surface of the lid member may face a portion of the end portion of the spool valve element.

One of the first magnetic attraction member and the second magnetic attraction member may be a ferromagnetic material, and the other of the first magnetic attraction member and the second magnetic attraction member may be a permanent magnet. The first and second magnetic attraction members may respectively be fixed to the end portion on the first direction side of the spool valve element and the valve housing directly or indirectly.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Embodiments of the present invention will be described hereinafter with reference to drawings.

Figure 1:
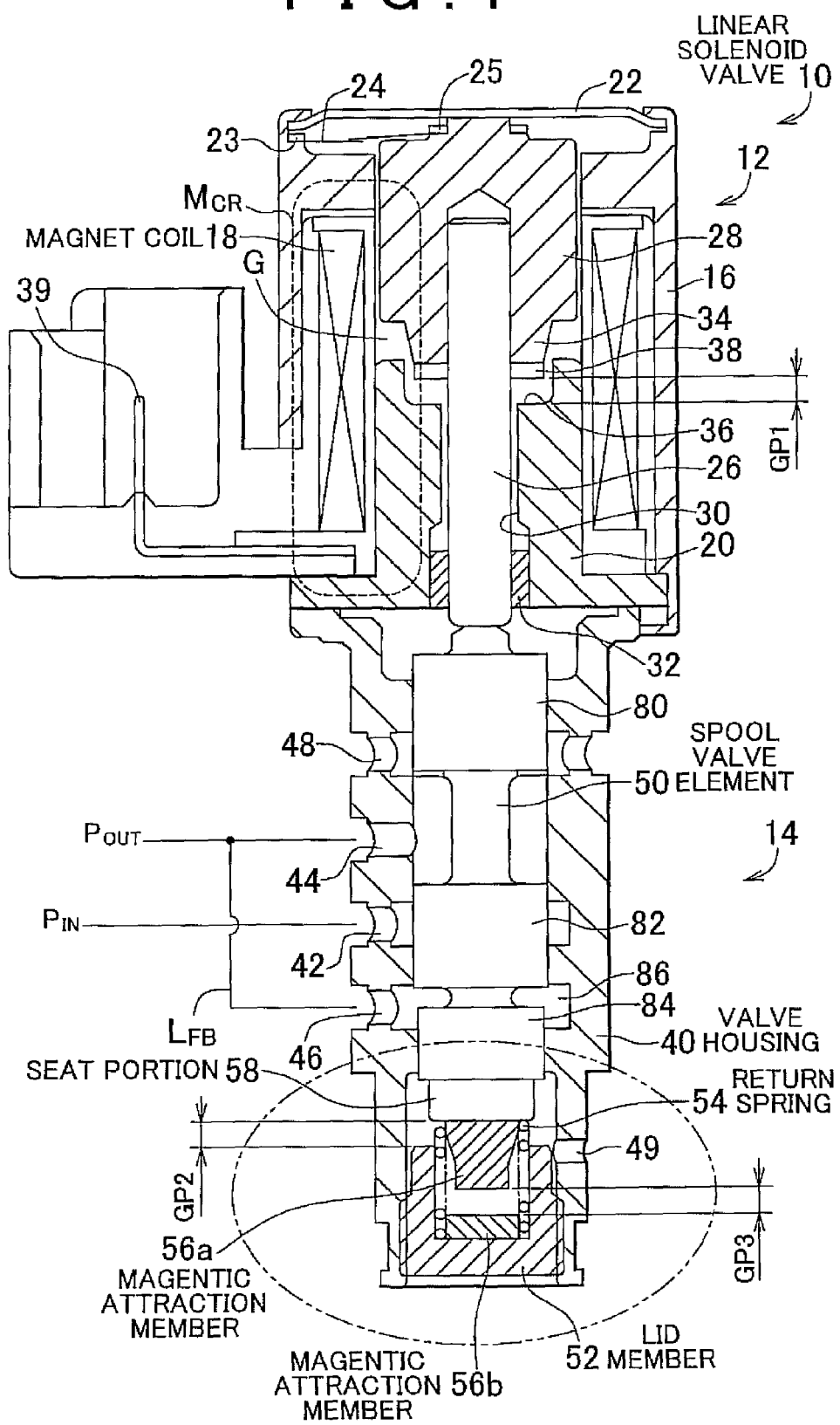
FIG. 1 is a cross-sectional view showing a construction of a linear solenoid valve as a solenoid valve according to an embodiment of the present invention.

FIG. 1 is a cross-sectional view of a solenoid valve according to an embodiment of the present invention. FIG. 1 shows a linear solenoid valve (solenoid valve) 10 that is used for hydraulic pressure control of a vehicle automatic transmission, such as line pressure control and shift transient pressure control. The linear solenoid valve 10 includes a linear solenoid portion 12 and a valve portion 14. The linear solenoid portion 12 electromagnetically generates a solenoid thrust $F_I$ with a magnitude according to a drive current $I_{SL}$ from a controller (not shown). The valve portion 14 is driven to regulate pressure based on the solenoid thrust $F_I$ and outputs a hydraulic signal pressure $P_{OUT}$ with a magnitude according to the above-described drive current $I_{SL}$.

The linear solenoid portion 12 includes a cylindrical yoke 16, a cylindrical magnet coil 18 that is concentrically accommodated in the yoke 16, a core member 20 that is caulked inside the yoke 16 at an end on the valve portion 14 side, a disk-shaped cover member 22 that is caulked inside the yoke 16 to close an opening at an end on the opposite side from the valve portion 14, a disk spring 24 the periphery of which is caulked on the yoke 16 together with the cover member 22 via a shim 23, and a plunger 28 one end of which is fixed to the center portion of the disk spring 24 using a caulking ring 25 and that has a shaft 26 protruding from the other end in an axial direction of the plunger 28. A through hole 30 is formed in the core member 20 extending in the axial direction thereof. The shaft 26 is slidably inserted into a guide bush 32 that is fitted in the through hole 30. Thus, the plunger 28 is supported so as to be movable in the axial or longitudinal direction thereof with a slight gap between the periphery of the plunger 28 and components surrounding the plunger 28. Incidentally, mutually facing surfaces (end faces) of the plunger 28 and the core member 20 respectively have a circular truncated conical protrusion 34 and an opening 36 to receive the protrusion 34. A stopper 38 that contacts the bottom surface of the opening 36 is fixed to the shaft 26 to prevent any further approach of the plunger 28 to the core member 20 in a state where the protrusion 34 is generally fitted in the opening 36. Accordingly, the distance GP1 (see FIG. 1) between the bottom surface of the opening 36 and the stopper 38 when the magnet coil 18 is not excited is a maximum moving amount (maximum stroke) $ST_{MAX}$ of a spool valve element 50.

The valve portion 14 includes a cylindrical valve housing 40 that is fixed to the core member 20 or the yoke 16, and an inlet port 42, an outlet port 44, a feedback port 46, a first drain port 48 and a second drain port 49 provided in the valve housing 40. The valve portion 14 further includes a spool valve element 50 that is slidably fitted in the valve housing 40 along the axial direction of the shaft 26 in a state contacting the shaft 26 to open and close between the inlet port 42 and the outlet port 44, a ferromagnetic lid member 52 that is squeezed into an end of the valve housing 40 on the opposite side from the linear solenoid portion 12, and a return spring 54 that is disposed coaxial with the spool valve element 50 between the spool valve element 50 and the lid member 52, and biases the spool valve element 50 so that the spool valve element 50 abuts on the shaft 26.

The valve portion 14 further includes a pair of magnetic attraction members 56a, 56b that magnetically attract each other with an attraction force $F_{MG}$ (=f(GP3)) smaller than the bias force $W_{SLT}$ of the return spring 54. The magnetic attraction members 56a, 56b are disposed in the return spring 54 along the axis of the spool valve element 50 so as to be spaced apart from each other in a moving direction of the spool valve element 50 by a distance GP3 (see FIG. 1) when the magnet coil 18 is not excited. The distance GP3 is equal to or more than the maximum moving amount $ST_{MAX}$ of the spool valve element 50. The magnetic attraction members 56a, 56b are respectively fixed to an end portion on a valve opening direction (first direction) side of the spool valve element 50 and the valve housing 40. More specifically, the magnetic attraction member 56a is a ferromagnetic material other than a permanent magnet, and is fixed to the end portion on the valve opening direction side of the spool valve element 50 by screw cramps. The magnetic attraction member 56b is a permanent magnet such as a ferrite magnet or neodymium magnet, and is provided on the return direction (second direction) side of the lid member 52 by screw cramps or the like, thereby fixed to the valve housing 40 via the lid member 52. The return direction is opposite to the above-described first direction (valve opening direction).

The seat portion 58 of the spool valve element 50 to which the magnet attraction member 56a is fixed, that is, the end portion on the valve opening direction (first direction) side of the spool valve element 50 has a diameter that is smaller than that of a third land 84 and is larger than the outer diameter of the return spring 54, and may preferably be formed of a ferromagnetic material. Further, the return direction side of the lid member 52 extends in a cylindrical form having an inner diameter larger than the outer diameter of the return spring 54 so as to surround the outer periphery of the return spring 54. The return direction side end surface of the extended cylinder is spaced apart from the seat portion 58 by the distance GP2 (see FIG. 1) and faces an annular area in the seat portion 58 that is formed outside the outer diameter of the spring 54. When the spool valve element 50 is moved the distance of the maximum moving amount $ST_{MAX}$ in the valve opening direction (first direction), the distance GP2 is not zero but is preferably as small as possible.

The magnitude relation among distances GP1, GP2 and GP3 will be described. The distance GP1, the distance GP2 and the distance GP3 may be equal to one another; however, the distance GP2 and distance GP3 may preferably be greater than the distance GP1 to secure the maximum moving amount $ST_{MAX}$ of the spool valve element 50. In other words, when the spool valve element 50 is moved the distance of the maximum moving amount $ST_{MAX}$ in the valve opening direction (first direction), it may be preferable to form a gap between the magnetic attraction members 56a, 56b and to form the gap as small as possible to generate the attraction force $F_{MG}$ enough to reduce the drive current $I_{SL}$. Further, the distance GP2 may preferably be smaller than the distance GP3 to protect the magnetic attraction member 56b formed of a permanent magnet.

When an excitation current (drive current) $I_{SL}$ is supplied to a terminal 39 of the magnet coil 18, a magnetic circuit $M_{CR}$, shown by the broken line in FIG. 1, is formed, and the magnet coil 18 generates a magnetic attraction force, i.e., an electromagnetic force in a direction to reduce the gap G formed in the magnetic circuit $M_{CR}$. Therefore, the magnet coil 18 generates an amount of solenoid thrust $F_I(=f(I_{SL}))$ that moves the plunger 28, which is supported movably in the direction of its axis (shaft center), in the first direction along the shaft center (axis) according to the excitation current $I_{SL}$, and then moves the spool valve element 50 through the shaft 26 in the first direction by the action of the electromagnetic force. Here, while the plunger 28 is supported movably in the axial direction thereof with a slight gap between the periphery of the plunger 28 and components surrounding the plunger 28, the slight gap is preferably as small as possible to reduce the magnetic reluctance of the magnetic circuit $M_{CR}$ and to increase drive efficiency.

Further, the return spring 54 biases the spool valve element 50 in the return direction (second direction), which is opposite to the first direction, and moves the spool valve element 50 in the return direction when the magnet coil is not excited. In other words, the return spring 54 applies the bias force $W_{SLT}$ to the spool valve element 50 in a valve closing direction (the return direction), and the linear solenoid portion 12 applies the solenoid thrust $F_I$ to the spool valve element 50 in the valve opening direction (first direction) through the shaft 26.

Furthermore, the spool valve element 50 includes a first land 80, a second land 82 having a diameter equal to that of the first land 80, and a third land 84 having a diameter smaller than those of the first and second lands 80, 82, in this order from the linear solenoid portion 12 side. The space between the second land 82 and the third land 84 functions as a feedback oil chamber 86 that communicates with the feedback port 46. Then, the output pressure $P_{OUT}$ from the outlet port 44 acts on the feedback port 46 via an external feedback oil path $L_{FB}$ as shown in FIG. 1 or an internal feedback oil path. Therefore, the output pressure $P_{OUT}$ is a fluid pressure that is determined so as to satisfy the following expression or equality (1) according to the solenoid thrust $F_I(=f(I_{SL}))$ of the linear solenoid portion 12 defined by the excitation current $I_{SL}$, where $A_{SLT}$ is the difference in pressure receiving area in the feedback oil chamber 86, more specifically, the difference in the pressure receiving area obtained by subtracting the area of an annular pressure receiving surface of the third land 84, which is a pressure receiving surface contributing to the movement of the spool valve element 50 in the valve opening direction (first direction), from the area of an annular pressure receiving surface of the second land 82, which is a pressure receiving surface contributing to the movement in the valve closing direction (return direction) (i.e., cross-sectional area of the second land 82-cross-sectional area of the third land 84). The output pressure $P_{OUT}$ acts on the spool valve element 50 as a feedback thrust $F_{FB}(=P_{OUT} \times A_{SLT})$ in the valve closing direction (return direction), due to the difference in the pressure receiving area $A_{SLT}$. $F_{MG}$ in the expression (1) is a function of the distance GP3 and increases as the distance GP3 decreases. $F_{MG}$ indicates a magnetic attraction force which the magnetic attraction members 56a, 56b act on each other (i.e., a magnetic attraction force between the magnetic attraction members 56a, 56b).

$$P_{OUT}=F_I/A_{SLT}+F_{MG}/A_{SLT}-W_{SLT}/A_{SLT} \quad (1)$$

$$F_I+F_{MG}=F_{FB}+W_{SLT} \quad (2)$$

$$F_{MG}<F_{FB}+W_{SLT} \quad (3)$$

Figure 2:
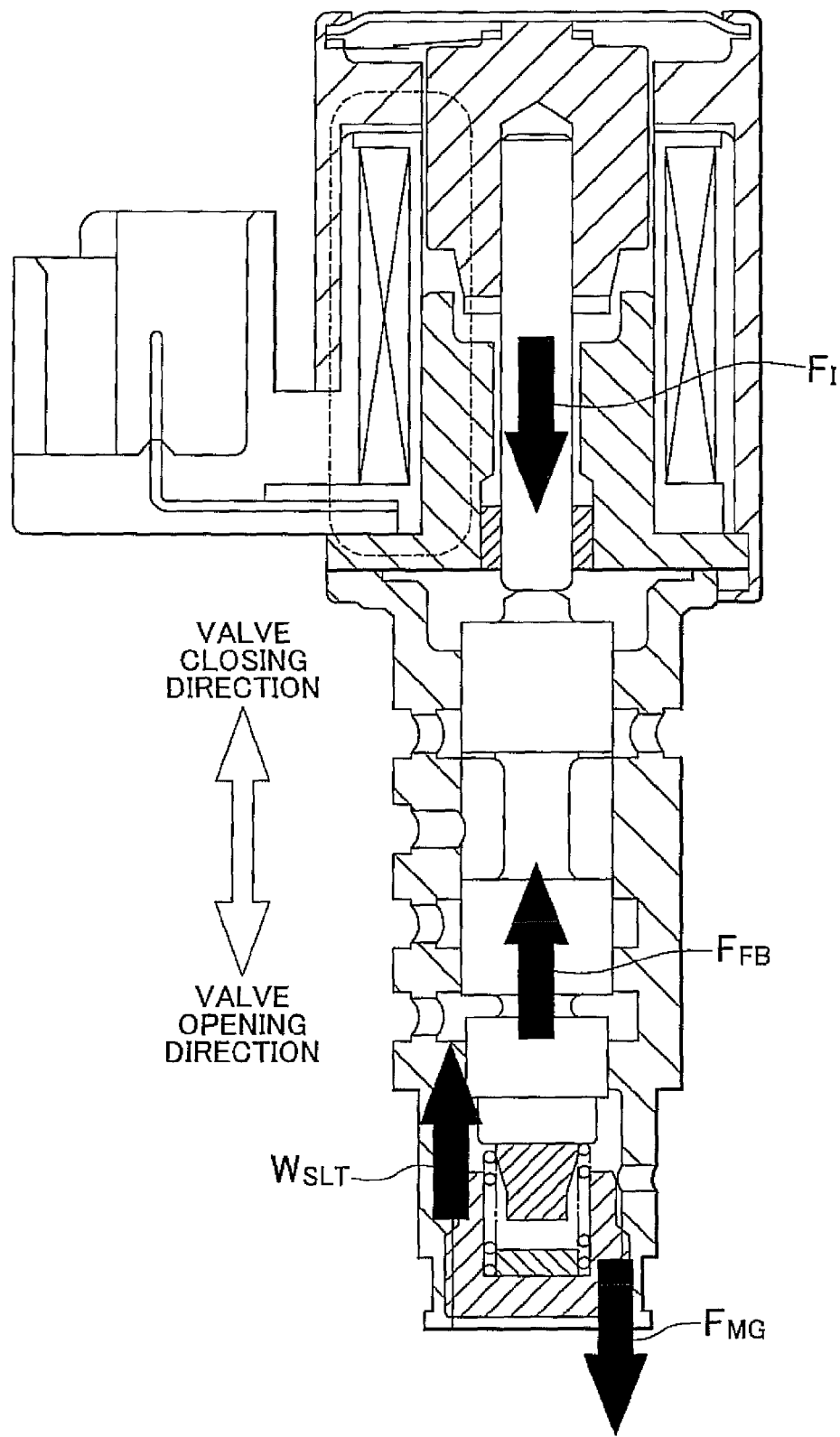
FIG. 2 is a view showing forces acting on a spool valve element of the linear solenoid valve shown in FIG. 1.

If the expression (1) is transformed in view of the relation "$F_{FB}=P_{OUT} \times A_{SLT}$," the expression (2) is obtained. FIG. 2 shows the relationship among forces expressed by the expression (2). Here, when the magnet coil 18 is switched from an excited state to an unexcited state ($F_I=0$), the spool valve element 50 must be moved in the valve closing direction to a stroke end. Therefore, in this embodiment, the attraction force $F_{MG}$ is smaller than the bias force $W_{SLT}$ of the return spring 54, regardless of the position of the spool valve element 50. More specifically, the attraction force $F_{MG}$ and the bias force $W_{SLT}$ of the return spring 54 are determined such that the relationship shown by the above expression (3) is satisfied. In other words, in this embodiment, regardless of the position of the spool valve element 50, the sum total of the feedback thrust $F_{FB}$ and the bias force $W_{SLT}$ of the return spring 54 acting on the spool valve element 50 is greater than the magnetic attraction force $F_{MG}$ between the magnetic attraction members 56a, 56b.

Figure 3:
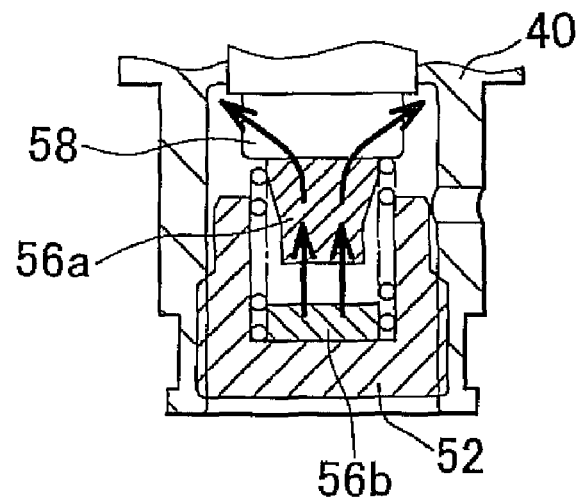
FIG. 3 is a view of the X portion in FIG. 1, explaining an analytical result of a magnetic field generated by a pair of magnetic attraction members when both a lid member and a seat portion are non-ferromagnetic metal, such as copper alloy.
Figure 4:
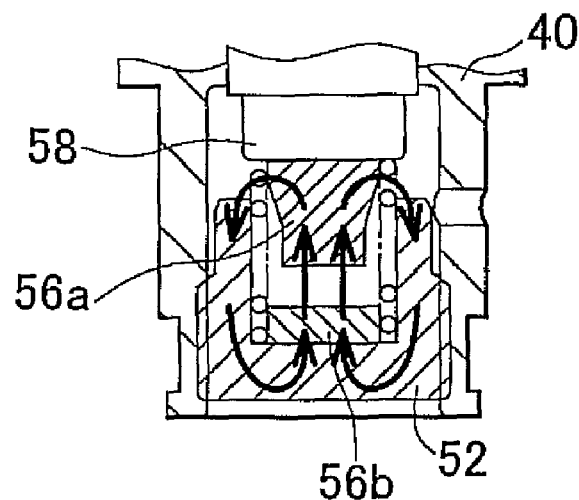
FIG. 4 is a view of the X portion in FIG. 1, explaining an analytical result of a magnetic field generated by the pair of magnetic attraction members when the lid member is pure iron and the seat portion is non-ferromagnetic metal.
Figure 5:
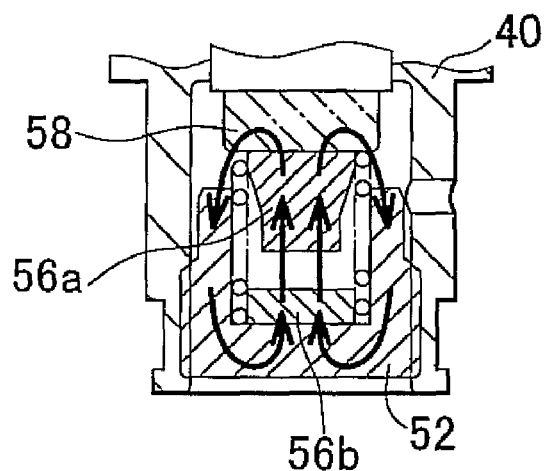
FIG. 5 is a view of the X portion in FIG. 1, explaining an analytical result of a magnetic field generated by the pair of magnetic attraction members when both the lid member and the seat portion are pure iron.

FIG. 3, FIG. 4 and FIG. 5 are views of the X portion in FIG. 1, explaining analytical results of magnetic fields generated by the pair of magnetic attraction members 56a, 56b. FIG. 3, FIG. 4 and FIG. 5 have in common that the magnetic attraction member 56a is pure iron, which is a ferromagnetic material, and the magnetic attraction member 56b is a permanent magnet. On the other hand, in FIG. 3, both the lid member 52 and the seat portion 58 are formed of a non-ferromagnetic metal, such as a copper alloy, in FIG. 4, the lid member 52 is pure iron, but the seat portion 58 is a non-ferromagnetic metal, and in FIG. 5, both the lid member 52 and the seat portion 58 (the area hatched with dashed-dotted lines) are pure iron. Note that, the bold arrows in FIG. 3, FIG. 4 and FIG. 5 schematically show the lines of magnetic force around the magnetic attraction member (permanent magnet) 56b when the magnetic attraction members 56a, 56b are at their closest to each other.

In FIG. 3, when the magnetic attraction members 56a, 56b are at their closest to each other, the lines of magnetic force diverge in the axial direction thereof and the maximum value of the attraction force $F_{MG}$ is 2N. In FIG. 4 and FIG. 5, when the magnetic attraction members 56a, 56b are at their closest to each other, the lines of magnetic force circulate, and the maximum value of the attraction force $F_{MG}$ is 9.5N in FIG. 4, and the maximum value of the attraction force $F_{MG}$ is 13.4N in FIG. 5. Thus, the attraction force $F_{MG}$ generated by the magnetic attraction member 56b is increased by using a ferromagnetic material as the lid member 52, and is further increased by using a ferromagnetic material as the seat portion 58 as well. In other words, in order to obtain a desired attraction force $F_{MG}$, when the lid member 52 is formed of a ferromagnetic material, a small permanent magnet with a weaker magnetic attraction force may be used as the magnetic attraction member 56b, as compared to when the lid member 52 is not formed of a ferromagnetic material. Further, when the seat portion 58 is also formed of a ferromagnetic material, a small permanent magnet with still weaker magnetic attraction force may be used as the magnetic attraction member 56b.

According to the embodiment, the valve portion 14 includes the magnetic attraction members 56a, 56b magnetically attract each other by the attraction force $F_{MG}$, which is smaller than the bias force $W_{SLT}$ of the return spring 54. The magnetic attraction members 56a, 56b are disposed so as to be spaced apart from each other in a moving direction (or axial direction) of the spool valve element 50 by the distance GP3 (see FIG. 1) when the magnet coil 18 is not excited. The distance GP3 is equal to or more than the maximum moving amount $ST_{MAX}$ of the spool valve element 50. The magnetic attraction members 56a, 56b are respectively fixed to the end portion on the valve opening direction (first direction) side of the spool valve element 50 and the valve housing 40. Accordingly, as the spool valve element 50 is moved further in the valve opening direction (first direction), the magnetic attraction members 56a, 56b are moved closer to each other. Thus, the attraction force $F_{MG}$ between the magnetic attraction members 56a, 56b cancels the bias force $W_{SLT}$ of the return spring 54 to a certain extent. This enables reduction in the solenoid thrust $F_I$ generated by the magnet coil 18, thereby reducing the power consumption of the linear solenoid valve 10 and the heat generation from the magnet coil 18. Further, because the magnetic attraction force $F_{MG}$ between the magnetic attraction members 56a, 56b is smaller than the bias force $W_{SLT}$ of the return spring 54, while the magnet coil 18 is excited and the spool valve element 50 is at the stroke end in the valve opening direction, when the magnet coil 18 is switched from an excited state to an unexcited state, the spool valve element 50 is not kept at the stroke end in the valve opening direction and is moved to the stroke end in the valve closing direction.

Further, in the above-described embodiment, the magnetic attraction member 56b is a permanent magnet, and is attached on the side in the return direction, which is opposite to the first direction, of the lid member 52, which is a ferromagnetic material attached to the valve housing 40. Thus, the magnetic attraction member 56b is fixed to the valve housing 40 through the lid member 52. Accordingly, because the lid member 52 on which the magnetic attraction member 56b is provided is formed of a ferromagnetic material, the magnetic attraction force $F_{MG}$ increases. Therefore, even if an inexpensive small permanent magnet with a weak magnetic attraction force is used as the magnetic attraction member 56b, sufficient attraction force $F_{MG}$ can be obtained.

Further, in the above-described embodiment, the seat portion 58 of the spool valve element 50 on which the magnetic attraction member 56a is fixed may preferably be formed of a ferromagnetic material. In this case, i.e., a ferromagnetic material is used as the seat portion 58, the magnetic attraction force $F_{MG}$ between the magnetic attraction members 56a, 56b further increases, and the magnetic attraction member 56a, 56b can be further downsized.

Moreover, in the above-described embodiment, a gap may be formed between the magnetic attraction members 56a and 56b, when the spool valve element 50 is moved the distance of the maximum moving amount $ST_{MAX}$ in the valve opening direction (first direction). In this case where the gap is formed, the magnetic attraction members 56a, 56b are prevented from being damaged by the contact or collision therebetween.

Furthermore, in the above-described embodiment, regardless of the position of the spool valve element 50, the sum total of the feedback thrust $F_{FB}$ and the bias force $W_{SLT}$ of the return spring 54 acting on the spool valve element 50 is greater than the magnetic attraction force $F_{MG}$ between the magnetic attraction members 56a, 56b. Accordingly, when the excited magnet coil 18 is switched from an excited state to an unexcited state, the spool valve element 50 is moved to the stroke end in the valve closing direction (return direction).

Further, in the above-described embodiment, because the attraction force $F_{MG}$ is generated by a permanent magnet serving as the magnetic attraction member 56b, the attraction force $F_{MG}$ acts as a thrust that moves the spool valve element 50 in the valve opening direction only when the magnetic attraction member 56a, 56b are located extremely close to each other, i.e., only when the spool valve element 50 are moved the distance equal to or nearly equal to the maximum moving amount $ST_{MAX}$ in the valve opening direction. Therefore, in a moving range of the spool valve element 50 defined by removing the range in which the attraction force $F_{MG}$ substantially acts on the spool valve element 50 from the movable range (entire stroke) of the spool valve element 50, i.e., in most of the movable range of the spool valve element 50, the attraction force $F_{MG}$ is regarded as zero. Accordingly, the control method similar to that used for an ordinary linear solenoid valve that does not have the pair of magnetic attraction members 56a, 56b may be used to control the linear solenoid valve 10 of the embodiment, and the pressure regulating accuracy similar to that of the ordinary linear solenoid valve can be achieved.

While the embodiment is described above with reference to the drawings, the present invention is not limited to the above-described embodiment.

For example, a part of or entire the spool valve element 50 may be formed of a metal such as a copper alloy, or a ferromagnetic material. Further, a part of or entire the valve housing 40 may also be formed of a metal such as a copper alloy, or a ferromagnetic material. Here, the ferromagnetic material may include, for example, iron (pure iron), nickel or cobalt, or an alloy or oxide including them.

Further, in the above-described embodiment, in the pair of magnetic attraction members 56a, 56b, the magnetic attraction member 56a fixed to the spool valve element 50 is made of a ferromagnetic material other than a permanent magnet, and the magnetic attraction member 56b fixed to the valve housing 40 is made of a permanent magnet. However, this may be reversed. That is, the magnetic attraction member 56a fixed to the spool valve element 50 may be a permanent magnet, and the magnetic attraction member 56b fixed to the valve housing 40 may be a ferromagnetic material other than a permanent magnet. Moreover, both of the magnetic attraction members 56a, 56b may be a permanent magnet, if the south and north poles thereof are disposed to attract each other.

Figure 6:
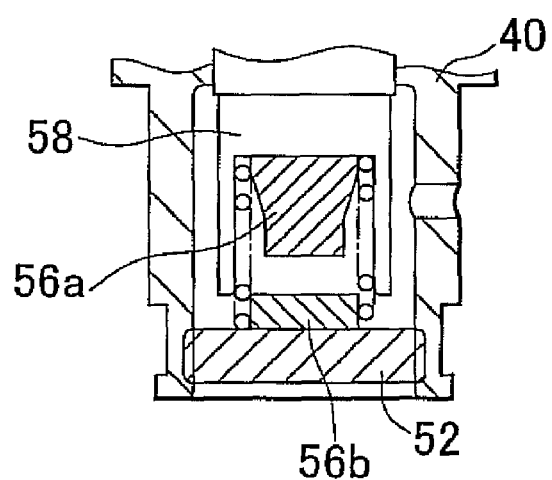
FIG. 6 is a detail view illustrating another example of construction of the X portion shown in FIG. 1.

Further, in the above-described embodiment, the return direction side of the lid member 52 extends in a cylindrical form having an inner diameter larger than the outer diameter of the return spring 54 so as to surround the outer periphery of the return spring 54. However, it is not necessary to extend in such a manner. For example, as shown in FIG. 6, which is a detail view of another example of construction of the X portion shown in FIG. 1, the lid member 52 may not extend in the cylindrical form, but the seat portion 58 of the spool valve element 50 may extend in the cylindrical form.

Still further, in the above-described embodiment, the magnetic attraction member 56a is directly fixed to the end portion on the valve opening direction side of the spool valve element 50. However, the magnetic attraction member 56a may be indirectly fixed to the end portion on the valve opening direction side of the spool valve element 50 via a separate component. Moreover, in the above-described embodiment, the magnetic attraction member 56b is indirectly fixed to the valve housing 40 via the lid member 52. However, the magnetic attraction member 56b may be directly fixed to the valve housing 40. In short, the magnetic attraction members 56a, 56b may respectively be fixed to the spool valve element 50 and the valve housing 40 directly or indirectly.

Further, in the above-described embodiment, the seat portion 58 of the spool valve element 50 is a part of the spool valve element 50. However, the seat member may be formed as a component separate from the spool valve element 50 and fixed to the spool valve element 50.

Further, in the above-described embodiment, the distance GP1 (see FIG. 1) between the bottom surface of the opening 36 and the stopper 38 is equal to the maximum moving amount $ST_{MAX}$ of the spool valve element 50 when the magnet coil 18 is not excited. However, the distance GP1 may be greater than the distance GP2 (see FIG. 1), and the distance GP2 may be equal to the maximum moving amount $ST_{MAX}$ of the spool valve element 50 when the magnet coil 18 is not excited.

Further, in the above-described embodiments, the linear solenoid valve 10 is described; however, solenoid valves for other purposes, such as a direction control valve may be used. Moreover, either a hydraulic equipment or pneumatic equipment may be used.

Still further, the linear solenoid valve 10 in the above-described embodiment has the feedback oil chamber 86; however, a linear solenoid valve without the feedback oil chamber 86 may also be used.

While some embodiments of the invention have been illustrated above, it is to be understood that the invention is not limited to details of the illustrated embodiments, but may be embodied with various changes, modifications or improvements, which may occur to those skilled in the art, without departing from the spirit and scope of the invention.

What is claimed is:

1. A solenoid valve comprising:
   a valve housing in which a spool valve element is fitted so as to be reciprocably slidable along an axis;
   a magnet coil that moves the spool valve element in a first direction along the axis by an action of an electromagnetic force;
   a return spring that biases the spool valve element in a second direction, which is opposite to the first direction, and moves the spool valve element in the second direction when the magnet coil is not excited; and
   first and second attraction members that are respectively fixed to an end portion on the first direction side of the spool valve element and the valve housing such that the first and the second attraction members are spaced apart from each other along the axis by a distance equal to or greater than a maximum moving amount of the spool valve element and magnetically attract each other by a magnetic attraction force smaller than a bias force of the return spring when the magnet coil is not excited.

2. The solenoid valve according to claim 1, wherein the second magnetic attraction member fixed to the valve housing is a permanent magnet, and is provided on the second direction side of a ferromagnetic lid member that is attached to the valve housing.

3. The solenoid valve according to claim 2, wherein the end portion on the first direction side of the spool valve element on which the first magnetic attraction member is fixed is a ferromagnetic material.

4. The solenoid valve according to claim 1, wherein a gap is formed between the first magnetic attraction member and second magnetic attraction member when the spool valve element is moved the maximum moving amount in the first direction.

5. The solenoid valve according to claim 1, wherein an output pressure of the solenoid valve acts on the spool valve element as a feedback thrust in the second direction due to a difference in pressure receiving area of the spool valve element, and a sum total of the feedback thrust and the bias force of the return spring acting on the spool valve element is greater than the magnetic attraction force between the first magnetic attraction member and the second magnetic attraction member.

6. The solenoid valve according to claim 1, wherein at least a portion of an end surface of a lid member faces a portion of the end portion of the spool valve element.

7. The solenoid valve according to claim 1, wherein one of the first magnetic attraction member and the second magnetic attraction member is a ferromagnetic material and the other of the first magnetic attraction member and the second magnetic attraction member is a permanent magnet.

* * * * *